various foreign patent documents

(12) United States Patent
Ito et al.

(10) Patent No.: US 6,596,068 B1
(45) Date of Patent: Jul. 22, 2003

(54) AQUEOUS INK COMPOSITION

(75) Inventors: Hiroshi Ito, Nagano (JP); Masayuki Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 104 days.

(21) Appl. No.: 09/589,431

(22) Filed: Jun. 7, 2000

(30) Foreign Application Priority Data

Jun. 9, 1999 (JP) ............................................. 11-162670
May 12, 2000 (JP) ........................................ 2000-140546

(51) Int. Cl.$^7$ ............................................. C09D 11/00
(52) U.S. Cl. .................... 106/31.6; 106/31.64; 106/478
(58) Field of Search ............................ 106/31.6, 31.64, 106/478

(56) References Cited

U.S. PATENT DOCUMENTS

| | | | | |
|---|---|---|---|---|
| 5,846,307 A | * | 12/1998 | Nagasawa et al. | 106/31.65 |
| 5,861,447 A | * | 1/1999 | Nagasawa et al. | 106/472 |
| 6,153,001 A | * | 11/2000 | Suzuki et al. | 106/31.65 |
| 6,368,397 B1 | * | 4/2002 | Ichizawa et al. | 106/31.65 |
| 6,468,342 B1 | * | 10/2002 | Itoh et al. | 106/478 |
| 2002/0135650 A1 | * | 9/2002 | Nagai et al. | 347/100 |

FOREIGN PATENT DOCUMENTS

| | | | | |
|---|---|---|---|---|
| EP | 0688836 | | 12/1995 | |
| EP | 0819737 | | 1/1998 | |
| EP | 0842994 | | 5/1998 | |
| EP | 0896986 | | 2/1999 | |
| JP | 646074 | | 1/1989 | |
| JP | 6431881 | | 2/1989 | |
| JP | 83498 | | 1/1996 | |
| JP | 1095941 | | 4/1998 | |
| JP | 10120958 | | 5/1998 | |
| JP | 10212426 | | 8/1998 | |
| WO | WO 00/52102 | * | 8/2000 | C09D/11/00 |

* cited by examiner

Primary Examiner—Mark L. Bell
Assistant Examiner—Veronica F. Faison
(74) Attorney, Agent, or Firm—Ladas & Parry

(57) ABSTRACT

Disclosed is an aqueous ink composition comprising an aqueous medium and a surface-modified pigment capable of dispersing and/or dissolving in water without a dispersant, wherein the composition has a free monovalent anion concentration of 250 ppm or less.

15 Claims, No Drawings

AQUEOUS INK COMPOSITION

FIELD OF THE INVENTION

This invention relates to an aqueous ink composition having dispersed therein carbon black or an organic pigment as a colorant. More particularly, it relates to an improvement of an aqueous ink composition containing a surface-modified pigment capable of dispersing and/or dissolving in water.

BACKGROUND OF THE INVENTION

Conventional aqueous inks used in writing pens or ink jet printers comprise water-soluble dyes. In order to improve image quality or image preservability, pigments such as carbon black have also come to be used as a colorant. For example, JP-A-64-6074 and JP-A-64-31881 (the term "JP-A" as used herein means an "unexamined published Japanese patent application") disclose aqueous pigment inks having carbon black dispersed with the aid of a surface active agent or a polymeric dispersant.

However, known aqueous inks containing pigments steeply increase the ink viscosity where the amount of the colorant is increased to increase the recording density. Further, the surface active agent or the polymeric dispersant which is added in excess so as to stabilize the disperse system tends to cause foaming or reduction of defoaming properties, which may result in printing instability particularly in use in an ink jet printer.

To solve these problems, JP-A-8-3498 and JP-A-10-120958 teach that carbon black modified with a specific amount of surface active hydrogen or a salt thereof can be dispersed spontaneously without using a surface active agent or a polymeric dispersant. JP-A-10-95941 proposes an ink jet ink comprising the above-described surface-modified carbon black and a glycol ether. JP-A-10-212426 proposes adjusting each of the total sulfur content and the total chlorine content of carbon black to 0.1% by weight or less in order to secure ionization of the functional group on the surface-modified carbon black.

The ink comprising the surface-modified carbon black that is capable of spontaneous dispersion is extremely effective in maintaining the ink viscosity and printing stability. However, this type of ink turned out to have the following disadvantage. In order to make the pigment capable of spontaneous dispersion, the pigment is surface-treated with an oxidizing agent, etc. The oxidizing agent, etc. tends to decompose to produce ionic substances. Ionic substances also generate from sulfur, etc. released from the pigment itself during the oxidation. If these ionic substances are produced in quantity, the ink undergoes an increase of viscosity, resulting in reduced storage stability. Such a problem does not arise with the aqueous pigment inks having carbon black dispersed with the aid of a surface active agent or a polymeric dispersant as disclosed in JP-A-64-6074 and JP-A-64-31881 supra.

SUMMARY OF THE INVENTION

An object of the present invention is to provide an aqueous ink composition which comprises a surface-modified pigment capable of dispersing and/or dissolving in water with no aid of a dispersant and exhibits improved printing stability while securing high storage stability.

The present invention provides an aqueous ink composition comprising an aqueous medium and a surface-modified pigment capable of dispersing and/or dissolving in water without a dispersant, wherein the composition has a free monovalent anion concentration of 250 ppm or less.

DETAILED DESCRIPTION OF THE INVENTION

The aqueous ink composition according to the present invention is a dispersion in an aqueous medium a surface-modified pigment capable of dispersing and/or dissolving in water without a dispersant, such as a surface active agent or a water-soluble resin, which is characterized in that the free monovalent anion concentration is 250 ppm or less. The language "capable of dispersing and/or dissolving in water without a dispersant" as used herein is intended to mean that a pigment can exist in water stably with a dispersible minimal particle size without using a dispersant. By the term "dispersible minimal particle size" as used herein is meant the smallest particle size that cannot be reduced further even if the dispersing time is extended. It is assumed that carbon black or an organic pigment having a large amount of a hydrophilic functional group introduced onto the surface thereof is spontaneously dispersed in water with a dispersible minimal particle size just like a water-soluble dye dissolving in water in the form of monomolecules.

Surface modification for making the pigment capable of dispersing and/or dissolving in water without a dispersant can be carried out by bonding a hydrophilic functional group, such as a carboxyl group, a carbonyl group or a hydroxyl group, or a salt thereof to the surface of the pigment either directly or via an alkyl group, an alkyl ether group, an aryl group, etc. Specifically, such surface modification can be effected by oxidizing the pigment surface with an oxidizing agent in water by chemical treatment to introduce a carboxyl group, a carbonyl group, a hydroxyl group, etc. or by grafting such a functional group or an active species containing the functional group to the pigment surface. It is particularly preferred that surface modification be carried out by oxidizing the pigment with a halogenic acid compound, such as an aqueous solution of sodium hypochlorite, an aqueous solution of calcium hypochlorite, an aqueous solution of sodium hypobromite, or an aqueous solution of sodium hypoiodite. Note that hypofluorite is practically unsuitable for surface modification because of its extreme instability.

The aqueous ink composition of the invention preferably contains the surface-modified pigment in a concentration of 1 to 15% by weight, more preferably 2 to 10% by weight, to secure a sufficient image density.

With the free monovalent anion concentration being adjusted to 250 ppm or less, preferably 150 ppm or less, the aqueous ink composition undergoes no increase in viscosity and exhibits excellent storage stability even when allowed to stand for a long period of time. The monovalent anion species the concentration of which should be controlled include halide ions, a nitrate ion, and a low-molecular weight carboxylate ion. Attention should particularly be paid to halide ions which are very likely to be present in a considerable amount as a result of decomposition of a halogenic acid salt used in wet oxidation for surface modification of the pigment. Such halide ions include a chloride ion originated in hypochlorites, a bromide ion originated in a hypobromites, and an iodide ion originated in a hypoiodite. These halide ions should be reduced to 250 ppm or less. A nitrate ion and a low-molecular weight carboxylate ion are present because the substances adsorbed on the pigment surface are released and oxidized with the oxidizing agent. It is also necessary to reduce these ions to 250 ppm or less.

In order not to deteriorate the disperse state of the dispersion, the control of the free monovalent anion concentration is preferably achieved by preparing the ink composition by using the surface-treated pigment dispersion having been purified by reverse osmosis, ultrafiltration, electro-dialysis, or a like technique. It is also possible to add an alkali, such as sodium hydroxide, to the dispersion before purification to form a salt with the existing monovalent anions.

The free monovalent anion concentration can be determined by, for example, separating the ink composition by ultrafiltration into a solid phase and a liquid phase, diluting the liquid phase with ultrapure water, and then analyzing by ion chromatography.

In addition to the free monovalent anions, the ink composition has monovalent anions inside the pigment particles or monovalent anions which are so strongly adsorbed on the surface of the pigment particles as not to be released even when allowed to stand. Such non-free monovalent anions, which may make the total monovalent anion concentration greater than 250 ppm, do not adversely affect the long-term storage stability of the ink as far as the free monovalent anion concentration is 250 ppm or less.

The pigment which can be used in the ink composition of the invention preferably includes carbon black and organic pigments. Carbon black species which can preferably be used include, but are not limited to, #20B, #40 and MA100 available from Mitubishi Chemical Corp.; Color Black FW18, Color Black S170 and Special Black 250 available from Degussa A. G.; Conductex SC and Raven 1255 available from Columbia Carbon Co., Ltd.; and Monarch 700, Monarch 880, and Elftex 12 available from Cabot Corp.

Examples of suitable organic pigments include azo pigments, phthalocyanine pigments, anthraquinone pigments, quinacridone pigments, thioindigo pigments, triphenylmethane lake pigments, and oxazine lake pigments. Oil soluble dyes, disperse dyes, and the like are also employable as long as they are insoluble in an aqueous medium.

Specific examples of useful organic pigments include yellow ones such as C.I. Pigment Yellow 1, 2, 3, 4, 5, 6, 7, 10, 11, 12, 13, 14, 15, 16, 17, 65, and 83; red ones such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 123, and 163; blue ones such as C.I. Pigment Blue 2, 3, 15, 16, 22, and 25; and black ones such as C.I. Pigment Black 1.

The aqueous medium serves as a medium for holding the surface-modified pigment and for imparting ink characteristics to the dispersion. The aqueous medium comprises water, a humectant, and a penetrant. If desired, it can further contain a fixing agent, a pH adjustor, an antioxidant and ultraviolet absorber, a preservative (or an antifungal), and other conventional ink additives.

Water as a component of the aqueous medium includes pure water obtained by ion exchange, ultrafiltration, reverse osmosis or distillation, and ultrapure water. Water sterilized by ultraviolet irradiation or addition of hydrogen peroxide is advantageous for logn-term storage of the ink composition or antifungal or antibacterial control.

The humectant to be used is selected from water-soluble and highly hygroscopic materials, such as polyols, e.g., g lycerol, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol; lactams, e.g., 2-pyrrolidone, N-methyl-2-pyrrolidone, and E-caprolactam; ureas, e.g., urea, thiourea, ethyleneurea, and 1,3-dimethylimidazolidinone; and saccharides, e.g., maltitol, sorbitol, gluconolactone, and maltose. The amount of the humectant to be added is selected so that the viscosity of the resulting ink composition containing other additives may not exceed 25 mPa·s.

The penetrant is used to improve the wetting properties for a recording medium thereby to accelerate ink penetration. Water-soluble organic solvents and surface active agents can be used as a penetrant.

The water-soluble organic solvent as a penetrant includes lower alcohol such as ethanol and propanol; cellosolves such as ethylene glycol monomethyl ether and ethylene glycol monoethyl ether; carbitols such as diethylene glycol monomethyl ether, diethylene glycol monoethyl ether, ethylene glycol mono-n-butyl ether, diethylene glycol n-butyl ether, and triethylene glycol n-butyl ether; and 1,2-alkanediols such as 1,2-hexanediol and 1,2-octanediol.

The surface active agent as a penetrant includes anionic surface active agents such as fatty acid salts and alkylsulfuric ester salts; nonionic surface active agents such as polyoxyethylene alkyl ethers and polyoxyethylene phenyl ethers; acetylene glycol type nonionic surface active agents (e.g., Surfynol 61, 82, 104, 440, 465 and 485, all available from Air Products and Chemicals Inc.), cationic surface active agents, and ampholytic surface active agents.

Since the surface-modified pigment used in the present invention is capable of dispersing and/or dissolving with no aid of a surface active agent as a dispersant, the above-described surface active agent is used only for acceleration of penetration. In other words, where a surface active agent is used to make a pigment dispersible, the surface active agent should be selected to exhibit adsorption affinity to the pigment used. In the present invention, the surface active agent to be added can be chosen, simply noting the performance as a penetrant with no need to consider such adsorption affinity.

The fixing agent includes water-soluble resins. Suitable fixing agents include water-soluble rosins, alginic acid derivatives, polyvinyl alcohol, hydroxypropyl cellulose, carboxymethyl cellulose, hydroxyethyl cellulose, methyl cellulose, styrene-acrylic acid resins, styrene-acrylic acid-acrylic ester resins, styrene-maleic acid resins, styrene-maleic half ester resins, acrylic acid-acrylic ester resins, isobutylene-maleic acid resins, rosin-modified maleic acid resins, polyvinylpyrrolidone, gum arabic starch, polyallylamine, polyvinylamine, and polyethyleneimine. Since the surface-modified pigment used in the present invention is capable of dispersing and/or dissolving in water with no aid of a water-soluble resin as a dispersant, the above-described water-soluble resin is used only for the purpose of ink fixation. In other words, where a water-soluble resin is used to make a pigment dispersible, the resin should be selected to exhibit adsorption affinity to the pigment used. In the present invention, on the other hand, the water-soluble resin to be added can be chosen, simply noting the performance as a fixing agent with no need to consider such adsorption affinity.

The pH adjustor includes alkali metal hydroxides and amines, such as lithium hydroxide, sodium hydroxide, potassium hydroxide, aqueous ammonia, triethanolamine, and diethanolamine.

The antioxidant and ultraviolet absorber includes allophanates, such as allophanate and methyl allophanate; biuret and its derivatives, such as dimethyl biuret and tetramethyl biuret; L-ascorbic acid and its salts; Tinuvin 328, 900, 1130, 384, 292, 123, 144, 622, 770 or 292, Irgacor 252 or 153, and Irganox 1010, 1076 or 1035, and MD 1024 (all available from Ciba-Geigy, Ltd.); and lanthanide oxides.

The preservatives include sodium benzoate, sodium pentachlorophenol, sodium 2-pyridinethiol-1-oxide, sodium sorbate, sodium dehydroacetate, and 1,2-dibenzothiazolin-3-one (Proxel CRL, BDN, GXL, XL-2 or TN, available from ICI).

The present invention will now be illustrated in greater detail with reference to Examples, but it should be understood that the invention is not deemed to be limited thereto.

EXAMPLE 1

A hundred grams of carbon black (MA100, available from Mitsubishi Chemical Corp.) was mixed with 1 kg of water and wet ground in a ball mill together with zirconia beads. To the dispersion was added 400 g of an aqueous solution of sodium hypochlorite, followed by boiling for 10 hours to conduct wet oxidation. The resulting pigment dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 10,000) to an electrical conductivity of 4 mS/cm, followed by concentration to a pigment concentration of 15 wt % to prepare a pigment dispersion.

Thirty grams of the resulting pigment dispersion, 10 g of glycerol (humectant), 5 g of 2-pyrrolidone (humectant), 4 g of t-pentanol (penetrant), and 1 g of a nonionic surface active agent (Nissan Nonion NS-220, available from Nippon Oil & Fats Co., Ltd.) (penetrant) were mixed up, and ultrapure water was added to the mixture to make 100 g. Triethanolamine was added thereto to pH 7.5. The mixture was stirred for 2 hours and filtered through a stainless steel filter having a pore size of about 5 $\mu$m to prepare an aqueous ink.

The resulting aqueous ink was filtered through a centrifugal ultrafiltration unit (Ultrafree 15, available from Nippon Millipore; cut-off molecular weight: 10,000). The filtrate was analyzed with an ion chromatograph (DX-500, supplied from Nippon Dionex) to find that the free chloride ion concentration was 250 ppm.

EXAMPLE 2

Forty grams of carbon black (Color Black S170, available from Degussa A.G.) was mixed with 1 kg of water and wet ground in a ball mill together with zirconia beads. To the dispersion was added 500 g of an aqueous solution of sodium hypochlorite, followed by boiling for 10 hours to conduct wet oxidation. The resulting dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 100,000) to an electrical conductivity of 3 mS/cm, followed by concentration to a pigment concentration of 15 wt % to prepare a pigment dispersion.

Thirty grams of the resulting pigment dispersion, 10 g of glycerol (humectant), 5 g of diethylene glycol (humectant), 5 g of diethylene glycol mono-n-butyl ether (penetrant), and 1 g of an acetylene glycol type surface active agent (Surfynol 465, available from Air Products and Chemicals Inc.) (penetrant) were mixed up, and ultrapure water was added to the mixture to make 100 g. The pH was adjusted to 7.2 by addition of triethanolamine. The mixture was stirred for 2 hours and filtered through a stainless steel filter having a pore size of about 5 $\mu$m to prepare an aqueous ink. The free chloride ion concentration of the ink was 98 ppm as measured in the same manner as in Example 1.

EXAMPLE 3

A hundred grams of an organic pigment C.I. Pigment Black 1 was mixed with 1 kg of water and wet ground in a ball mill together with zirconia beads. To the dispersion was added 200 g of an aqueous solution of sodium hypochlorite, followed by stirring for 5 hours to conduct wet oxidation. The resulting dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 100,000) to an electrical conductivity of 6 mS/cm, followed by concentration to a pigment concentration of 15 wt % to prepare a pigment dispersion.

Thirty-five grams of the resulting pigment dispersion, 10 g of glycerol (humectant), 5 g of diethylene glycol (humectant), and 7.5 g of diethylene glycol mono-n-butyl ether (penetrant) were mixed up, and ultrapure water was added to the mixture to make 100 g. The pH was adjusted to 7.3 by addition of triethanolamine. The mixture was stirred for 2 hours and filtered through a stainless steel filter having a pore size of about 5 $\mu$m to prepare an aqueous ink. The free chloride ion concentration of the ink was 250 ppm as measured in the same manner as in Example 1.

EXAMPLE 4

Fifty grams of an organic pigment C.I. Pigment Blue 15 was mixed with 1 kg of water and wet ground in a ball mill together with zirconia beads. To the dispersion was added 150 g of an aqueous solution of sodium hypochlorite, followed by stirring for 10 hours to conduct wet oxidation. The resulting dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 100,000) to an electrical conductivity of 6 mS/cm, followed by concentration to a pigment concentration of 15 wt % to prepare a pigment dispersion.

Thirty grams of the resulting pigment dispersion, 10 g of glycerol (humectant), 5 g of diethylene glycol (humectant), 5 g of die thylene glycol mono-n-butyl ether (penetrant), and 1 g of an acetylene glycol type surface active agent (Surfynol 465, penetrant) were mixed up, and ultrapure water was added to the mixture to make 100 g. Triethanolamine was added thereto to pH 7.2. The mixture was stirred for 2 hours and filtered through a stainless steel filter having a pore size of about 5 $\mu$m to prepare an aqueous ink. The free chloride ion concentration of the ink was 180 ppm as measured in the same manner as in Example 1.

EXAMPLE 5

Fifty grams of an organic pigment C.I. Pigment Yellow 74 was mixed with 1 kg of water and wet ground in a ball mill together with zirconia beads. To the dispersion was added 100 g of an aqueous solution of sodium hypochlorite, followed by stirring for 10 hours to conduct wet oxidation. The resulting dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 100,000) to an electrical conductivity of 5 mS/cm, followed by concentration to a pigment concentration of 15 wt % to prepare a pigment dispersion.

Thirty grams of the resulting pigment dispersion, 10 g of glycerol (humectant), 5 g of diethylene glycol (humectant), 5 g of diethylene glycol mono-n-butyl ether (penetrant), and 1 g of an acetylene glycol type surface active agent (Surfynol 465, penetrant)) were mixed up, and ultrapure water was added to the mixture to make 100 g. The pH was adjusted to 7.5 with triethanolamine. The mixture was stirred for 2 hours and filtered through a stainless steel filter having a pore size of about 5 μm to prepare an aqueous ink. The free chloride ion concentration of the ink was 120 ppm as measured in the same manner as in Example 1.

EXAMPLE 6

Fifty grams of an organic pigment C.I. Pigment Red 122 was mixed with 1 kg of water and wet ground in a ball mill together with zirconia beads. To the dispersion was added 250 g of an aqueous solution of sodium hypochlorite, followed by stirring for 10 hours to conduct wet oxidation. The resulting dispersion was filtered through a glass fiber filter (GA-100, available from Advantec Toyo K.K.) and washed with water. The wet cake was re-dispersed in 5 kg of water, and the dispersion was desalted by ultrafiltration using a Minitan ultrafiltration system (available from Millipore Corp.; cut-off molecular weight: 100,000) to an electrical conductivity of 7 mS/cm, followed by concentration to a pigment concentration of 15 wt % to prepare a pigment dispersion.

Thirty grams of the resulting pigment dispersion, 10 g of glycerol (humectant), 5 g of diethylene glycol (humectant), 5 g of diethylene glycol mono-n-butyl ether (penetrant), and 1 g of an acetylene glycol type surface active agent (Surfynol 465, penetrant) were mixed up, and ultrapure water was added to the mixture to make 100 g. The pH was adjusted to 7.6 with triethanolamine. The mixture was stirred for 2 hours and filtered through a stainless steel filter having a pore size of about 5 μm to prepare an aqueous ink. The free chloride ion concentration of the ink was 230 ppm as measured in the same manner as in Example 1.

COMPARATIVE EXAMPLE 1

An aqueous ink was prepared in the same manner as in Example 2, except that the desalting was carried out to an electrical conductivity of 10 mS/cm. The free chloride ion concentration of the resulting ink was 298 ppm.

COMPARATIVE EXAMPLE 2

An aqueous ink was prepared in the same manner as in Example 3, except that the desalting was carried out to an electrical conductivity of 12 mS/cm. The free chloride ion concentration of the resulting ink was 470 ppm.

The aqueous inks prepared in Examples and Comparative Examples were evaluated in accordance with the following test methods. The results obtained are shown in Table 1.

1) Printing Stability

A piezoelectric on-demand type ink jet printer MJ-930 (supplied by Seiko Epson Corp.) was loaded with the ink, and paper of A4 size was printed continuously to obtain 3000 copies. The printing stability was rated as follows.

A . . . No printing disturbances was observed until 3000 copies were obtained, or the printer did not need cleaning until every 500 or more copies, in average, were obtained.

B . . . The printer needed cleaning for every 100 to 500 copies in average.

C . . . The printer needed cleaning for every 99 or less copies in average.

2) Storage Stability

The ink was allowed to stand at 60° C. for 1 month, and the ratio of the viscosity after the standing to that before standing was taken as a measure of storage stability, rated as follows.

A . . . The ratio was within 95 to 105%.
B . . . The ratio was 80 to 120%.
C . . . The ratio was less than 80% or more than 120%.

The results are shown in Table 1 below.

TABLE 1

|  | Free Monovalent Anion Concn. (ppm) | Printing Stability | Storage Stability |
| --- | --- | --- | --- |
| Example 1 | 250 | A | A |
| Example 2 | 98 | A | A |
| Example 3 | 250 | B | A |
| Example 4 | 180 | A | A |
| Example 5 | 120 | A | A |
| Example 6 | 230 | A | A |
| Compara. Example 1 | 298 | B | B |
| Compara. Example 2 | 470 | B | C |

As can be seen from Table 1, the aqueous ink compositions of Examples 1 to 6, wherein the free monovalent anion concentration was controlled to 250 ppm or less, were rated A or B in printing stability and A in storage stability, proving satisfactory in both printing stability and storage stability. The aqueous ink compositions of Comparative Examples 1 and 2 whose free monovalent anion concentration exceeded 250 ppm had poor storage stability. In particular, the ink of Comparative Example 2 having a high free chloride ion concentration turned into gel when allowed to stand at 60° C., failing to possess both printing stability and storage stability.

What is claimed is:

1. An aqueous ink composition comprising an aqueous medium and a surface-modified pigment capable of dispersing and/or dissolving in water without a dispersant, wherein the composition comprises a monovalent halide ion and has a free monovalent anion concentration of 250 ppm or less.

2. An aqueous ink composition according to claim 1, wherein said halide ion is a chloride ion, a bromide ion or an iodide ion.

3. An aqueous ink composition according to claim 1, wherein said surface-modified pigment is carbon black having been oxidized with a halogenic acid compound.

4. An aqueous ink composition according to claim 1, wherein said surface-modified pigment is an organic pigment having been oxidized with a halogenic acid compound.

5. An aqueous ink composition according to claim 1, wherein said surface-modified pigment is carbon black having been oxidized with a halogenic acid compound.

6. An aqueous ink composition according to claim 2, wherein said surface-modified pigment is carbon black having been oxidized with a halogenic acid compound.

7. An aqueous ink composition according to claim 1, wherein said surface-modified pigment is an organic pigment having been oxidized with a halogenic acid compound.

8. An aqueous ink composition according to claim 2, wherein said surface-modified pigment is an organic pigment having been oxidized with a halogenic acid compound.

9. In an aqueous ink composition comprising an aqueous medium and a pigment that has been modified to render it dispersible or dissolvable in water without a dispersant, wherein the pigment has been modified by surface treating the pigment with an oxidizing agent which causes there to be free monovalent halide anions in the composition, the improvement wherein the composition is purified so that it has a free monovalent anion concentration of 250 ppm or less.

10. An aqueous ink composition according to claim 9, wherein said halide ions comprise chloride ions, bromide ions or iodide ions.

11. An aqueous ink composition according to claim 10, wherein said modified pigment is carbon black that has been oxidized with a halogenic acid compound.

12. An aqueous ink composition according to claim 10, wherein said modified pigment is an organic pigment that has been oxidized with a halogenic acid compound.

13. A process for preparing the aqueous ink composition of claim 9 comprising a) mixing the pigment with water to form a mixture;

b) adding the oxidizing agent to the mixture under conditions that result in modification of the pigment with generation of the free monovalent anions; and c) purifying the mixture to remove sufficient of the free monovalent anions such that the composition has said free monovalent anion concentration of 250 ppm or less.

14. The process according to claim 13, wherein the oxidizing agent is a halogenic acid compound.

15. The process according to claim 14, wherein the mixture is purified in step (c) by reverse osmosis, ultrafiltration, or electro-dialysis.

* * * * *